(12) United States Patent
Stead (10) Patent No.: US 6,380,947 B1
(45) Date of Patent: Apr. 30, 2002

(54) METHOD AND APPARATUS FOR DISPLAYING AND TREE SCROLLING A HIERARCHICAL DATA STRUCTURE

(75) Inventor: Larry Stead, Upper Montclair, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/465,424

(22) Filed: Dec. 16, 1999

Related U.S. Application Data (60) Provisional application No. 60/145,015, filed on Jul. 22, 1999.

(51) Int. Cl.[7] .............................. G06T 11/60; G06T 9/40
(52) U.S. Cl. ....................... 345/645; 345/784; 345/854; 707/514; 707/515
(58) Field of Search ................................ 345/643, 645, 345/440, 440.2, 713, 797, 798, 784, 785, 786, 787, 788, 783, 841, 854, 853, 855; 707/103, 6, 3, 4, 100, 514, 513, 515

(56) References Cited

U.S. PATENT DOCUMENTS

| | | | | |
|---|---|---|---|---|
| 5,551,027 A | * | 8/1996 | Choy et al. ................. | 707/201 |
| 5,619,632 A | * | 4/1997 | Lamping et al. ............ | 345/441 |
| 5,701,467 A | * | 12/1997 | Freeston .................... | 707/100 |
| 5,787,430 A | * | 7/1998 | Doeringer et al. .......... | 707/100 |
| 5,878,421 A | * | 3/1999 | Ferrell et al. ............... | 707/100 |
| 5,917,492 A | * | 6/1999 | Bereiter et al. ............. | 345/854 |
| 6,085,187 A | * | 7/2000 | Carter et al. ................. | 707/3 |
| 6,158,044 A | * | 12/2000 | Tibbetts ........................ | 717/1 |
| 6,212,527 B1 | * | 4/2001 | Gustman ..................... | 707/102 |
| 6,236,400 B1 | * | 5/2001 | Guerrero ..................... | 345/854 |
| 6,243,700 B1 | * | 6/2001 | Zellweger ...................... | 707/3 |
| 6,297,824 B1 | * | 10/2001 | Hearst et al. ................. | 345/901 |

* cited by examiner

Primary Examiner—Jeffery Brier
Assistant Examiner—Thu-Thao Havan
(74) Attorney, Agent, or Firm—Kenyon & Kenyon (57) ABSTRACT

Methods and apparatus to display and scroll hierarchical data. A plurality of parent nodes can be displayed within a first display area, with each displayed parent node of the plurality of parent nodes having at least one child node. A computer can determine that at most one child node for each displayed parent node of the plurality of parent nodes is to be displayed. A child node scrolling instruction can be received. A child node display percentile can be determined based at least in part on the child node scrolling instruction. One child node of each displayed parent node of the plurality of parent nodes can be selected based at least in part on the determined child node display percentile. Each selected one child node of each displayed parent node of the plurality of parent nodes can be displayed in a second display area, with each displayed child node being displayed as associated with the displayed parent node of the displayed child node.

15 Claims, 11 Drawing Sheets

FIG. 1
KNOWN ART

| | A | B | C |
|---|---|---|---|
| 1 | ARTIST A | ALBUM E | SONG M |
| 2 | ARTIST A | ALBUM E | SONG N |
| 3 | ARTIST A | ALBUM E | SONG O |
| 4 | ARTIST B | ALBUM H | SONG P |
| 5 | ARTIST B | ALBUM H | SONG Q |
| 6 | ARTIST B | ALBUM H | SONG R |
| 7 | ARTIST B | ALBUM H | SONG S |
| 8 | ARTIST B | ALBUM J | SONG T |
| 9 | ARTIST B | ALBUM J | SONG U |
| 10 | ARTIST C | ALBUM K | SONG V |
| 11 | ARTIST C | ALBUM L | SONG W |
| 12 | ARTIST C | ALBUM L | SONG X |

FIG. 2
KNOWN ART

| | A | B | C |
|---|---|---|---|
| 1 | 305 | 310 | 311 |
| 2 | 305 | 310 | 312 |
| 3 | 305 | 310 | 313 |
| 4 | 405 | 410 | 411 |
| 5 | 405 | 410 | 412 |
| 6 | 405 | 410 | 413 |
| 7 | 405 | 410 | 414 |
| 8 | 405 | 420 | 421 |
| 9 | 405 | 420 | 422 |
| 10 | 505 | 510 | 511 |
| 11 | 505 | 520 | 521 |
| 12 | 505 | 520 | 522 |

METHOD AND APPARATUS FOR DISPLAYING AND TREE SCROLLING A HIERARCHICAL DATA STRUCTURE

CROSS REFERENCE TO RELATED APPLICATION

The present application claims the benefit of U.S. provisional patent application Ser. No. 60/145,015 entitled "DISPLAYING AND SCROLLING A HIERARCHICAL DATA STRUCTURE" filed on Jul. 22, 1999.

FIELD OF THE INVENTION

Embodiments of the present invention relate to text and graphical data user interfaces. More particularly, embodiments of the present invention relate to displaying and scrolling a hierarchical data structure.

BACKGROUND OF THE INVENTION

Modern computers and data processing devices typically utilize displays such as CRT's (Cathode Ray Tubes) and LCD's (Liquid Crystal Displays) to display text and graphics data. A user interacts with an application program that allows the creation, viewing and/or editing of a data file or document on the display device. Data files or documents often contain a large amount of text and graphics data that cannot be displayed simultaneously on a display.

Computing devices typically can execute a technique known as scrolling to permit a user to navigate through a document. Scrolling is an operation in which a user issues commands to a computing device to instruct it to display a particular portion of data on a display. The user scrolls a document by issuing commands through a keyboard or mouse. Known scrolling controls include a scroll bar, consisting of an icon displayed on the display, that allows the user to instruct the computer (via a pointing device such as a mouse) to display a different portion of the document. Conventional scrolling controls provide a range of functionality, typically allowing the user to scroll data up, down, left or right.

Figure 1:
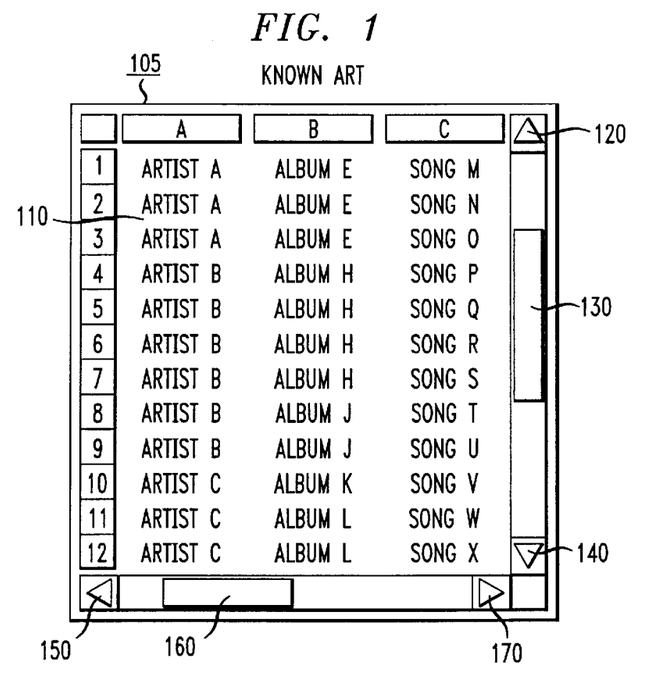
FIG. 1 shows a conventional user interface with scrolling functionality.

FIG. 1 shows a conventional user interface with scrolling functionality. Typically the user interface depicted in FIG. 1 may be implemented in a windows environment but can also be applicable to a non-windows environment. In one embodiment, the conventional user interface is a graphical user interface (GUI). The user interface depicted in FIG. 1 includes an arrangement of control icons for performing scrolling operations. Window 105 consists of a display area 110, left scrolling button 150, right scrolling button 170, horizontal scroll bar 160, up scrolling button 120, down scrolling button 140, and vertical scroll bar 130. When a user selects any of left scrolling button 150, right scrolling button 170, up scrolling button 120 or down scrolling button 140 by clicking on the respective scrolling button using a mouse, window 105 scrolls in the respective direction. The scrolling windows includes portions of data 14–26. The position of the horizontal scroll bar 160 showing that additional data can be displayed to the left and the right, and the position of the vertical scroll bar 130 showing that additional data can be displayed to the top and the bottom. The user may also scroll window 105 by clicking and dragging horizontal scroll bar 160 or vertical scroll bar 130 in the desired direction of scrolling.

The conventional user interface illustrated in FIG. 1 can display hierarchical data. An example of hierarchical data includes music data, e.g., artist, album and song data. A music database can contain music from three artists: artist A, artist B, and artist C. The music database can contain album E of artist A, which album E includes songs M, N and O. Album H and album J of artist B can be included in the music database, where album H includes songs P, Q, R, and S, and album J includes songs T and U. The music database can include albums K and L of artist C, where album K includes song V and album L includes song W and song X. The music data can be displayed in the conventional user interface illustrated in FIG. 1 by including the artist data in a column A of window 105, album data in a column B of window 105, and song data in a column C of window 105. Each song of the song data can be displayed on one row of rows 1–12 of window 105. The conventional user interface of FIG. 1 displays the hierarchical album and artist data for each of songs M–X, but the display is repetitive (e.g., displaying three instances of artist A in cell A1 (i.e., the cell located in column A and row 1), cell A2, and cell A3) and the hierarchical nature of the data is obscured.

Figure 2:
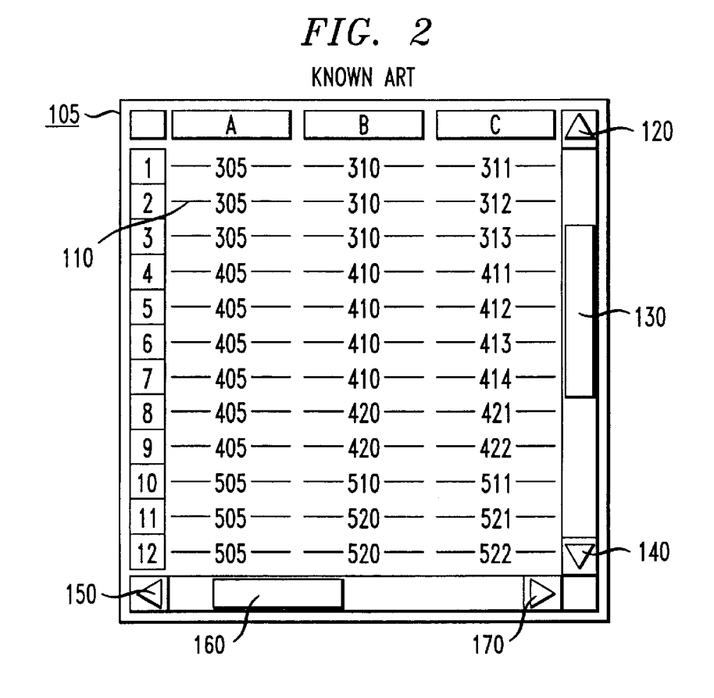
FIG. 2 shows the user interface of FIG. 1 displaying a portion of the hierarchical data illustrated in FIG. 3.
Figure 3:
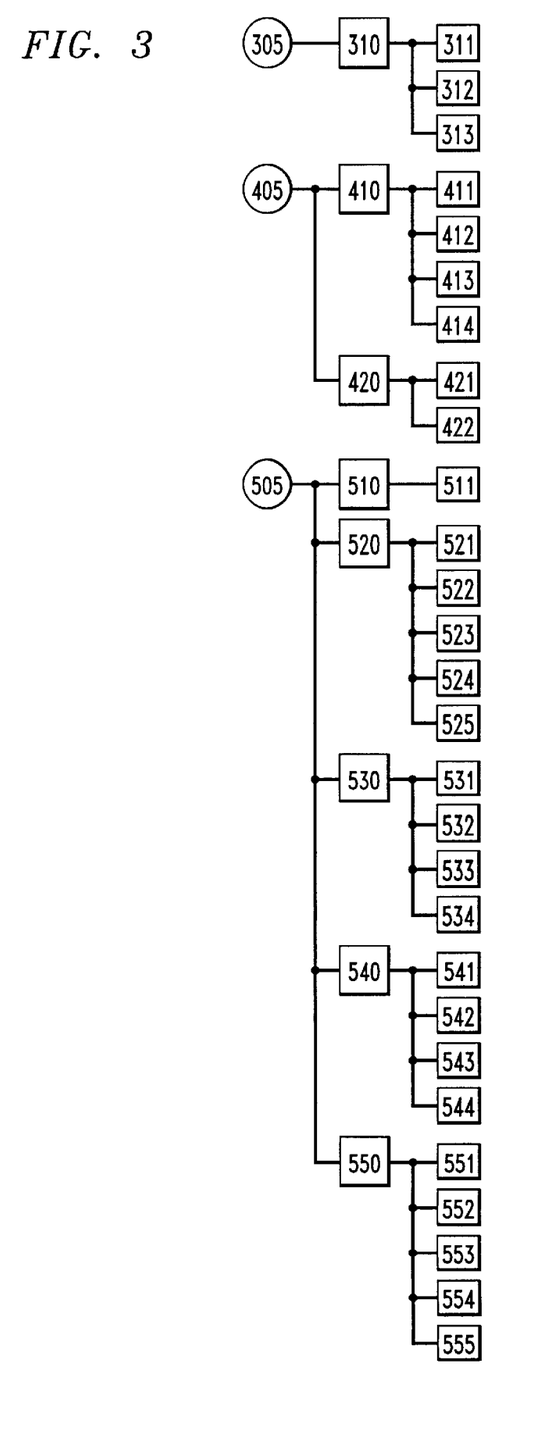
FIG. 3 illustrates a hierarchical data set.

FIG. 2 shows the user interface of FIG. 1 displaying a portion of the hierarchical data illustrated in FIG. 3. FIG. 3 illustrates a hierarchical data set. The hierarchical data includes three root nodes 305, 405 and 505. In another embodiment, each of nodes 305, 405 and 505 are child nodes of a parent node. Each of root nodes 305, 405 and 505 have at least one non-terminal node. A non-terminal node is typically a node that has both a parent node and at least one child node. A terminal node (i.e., a leaf node) is typically a node that has a parent node but no child nodes. Root node 305 has non-terminal node 310, which has terminal nodes 311–313. Root node 405 has non-terminal nodes 410 and 420, which respectively have terminal nodes 411–414 and terminal nodes 421–422. Root node 505 has non-terminal nodes 510, 520, 530, 540 and 550, which respectively have the following terminal nodes: 511; 521–525; 531–534; 541–544; and 551 to 555.

FIG. 2 displays portion of the hierarchical data illustrated in FIG. 3. FIG. 2 identifies the root nodes in column A of window 105, non-terminal nodes in column B of window 105, and terminal nodes in column C of window 105. Each of terminal nodes 311–313, 411–414, 421–422, 511, and 521–522 are displayed on one row of rows 1–12 of window 105 in FIG. 2. The conventional user interface of FIG. 2 displays the root node and non-terminal node of each of terminal nodes 311–313, 411–414, 421–422, 511, and 521–522, but the display is repetitive (e.g., displaying three instances of root node 305 in cells A1, A2, and A3). Moreover, the pertinent hierarchical relationships are obscured, which can result in confusion and inefficiency for a user viewing the conventional user interface of FIG. 2. In view of the foregoing, it can be appreciated that a substantial need exists for methods and apparatus which can advantageously display hierarchical data.

SUMMARY OF THE INVENTION

Embodiments of the present invention include methods and apparatus to display and scroll hierarchical data. A plurality of parent nodes can be displayed within a first display area, with each displayed parent node of the plurality of parent nodes having at least one child node. A computer can determine that at most one child node for each displayed parent node of the plurality of parent nodes is to be displayed. A child node scrolling instruction can be received. A child node display percentile can be determined based at least in part on the child node scrolling instruction. One child node of each displayed parent node of the plurality of parent nodes can be selected based at least in part on the determined child node display percentile. Each selected one child node of each displayed parent node of the plurality of parent nodes can be displayed in a second display area, with each displayed child node being displayed as associated with the displayed parent node of the displayed child node.

DETAILED DESCRIPTION

Embodiments of methods and apparatus to display and tree scroll hierarchical data are described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

Figure 4:
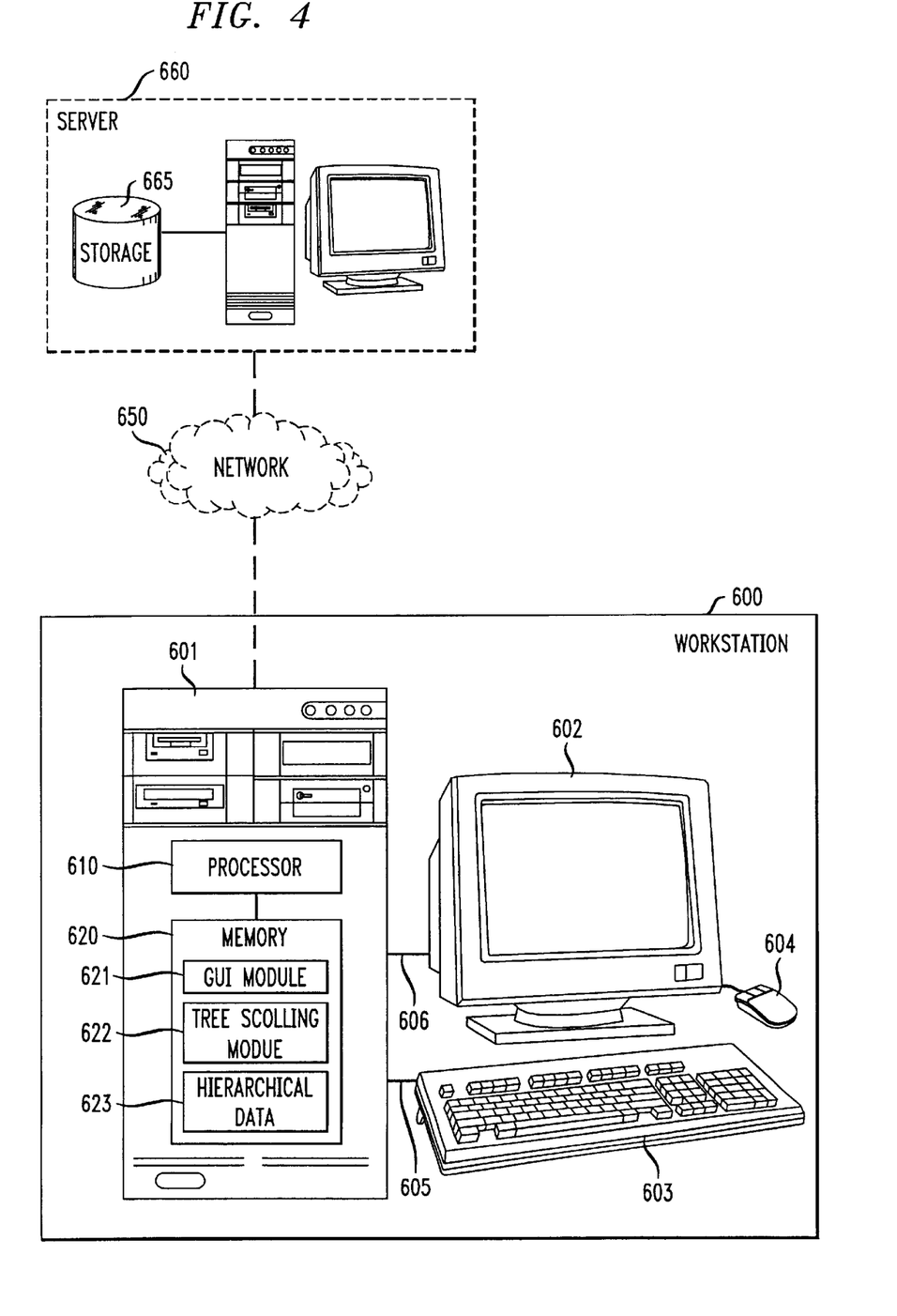
FIG. 4 shows an illustration of a system in accordance with an embodiment of the present invention.

FIG. 4 shows an illustration of a system in accordance with an embodiment of the present invention. A workstation 600 includes computer 601, which can coupled to a video display 602 via an external graphics bus 606. The external graphics bus 606 can be an Advanced Graphics Port (AGP) compliant bus. Computer 250 in one embodiment includes a processor 610, such as the Pentium® III processor manufactured by Intel Corp. of Santa Clara, Calif. In another embodiment, the processor 610 can be an Application Specific Integrated Circuit (ASIC). Computer 601 can includes a memory 620 coupled to the processor. The term "coupled" means connected directly or indirectly. The memory 620 includes a devices adapted to store digital information, such as Dynamic Random Access Memory (DRAM), Rambus® DRAM (RDRAM), flash memory, a hard disk, an optical digital storage device, or a combination thereof, etc. Rambus® technology is licensed by Rambus Inc. of Mountain View, Calif. The computer 601 can be coupled to a keyboard 603 and a mouse 604 via an external computer bus 605. In one embodiment, the external computer bus 605 is a Universal Serial Bus (USB) compliant bus.

Memory 620 can include instructions adapted to be executed by the processor 610 to perform a method in accordance with an embodiment of the present invention. The term "instructions adapted to be executed" is meant to encompass any instructions that are ready to be executed in their present form (e.g., machine code) by a processor, or require further manipulation (e.g., compilation, decryption, decoding, or provided with an access code, etc.) to be ready to be executed by a processor (e.g., processor 610). In one embodiment, the memory 620 can include a GUI module 621 to implement a GUI (i.e., graphical user interface). In conjunction with the GUI module 621, a tree scrolling module 622 can implement an embodiment of the present invention with respect to hierarchical data 623.

In another embodiment of the present invention, the workstation 600 is coupled to a server 660 via a network 650. In one embodiment, the server 660 is coupled to a storage device 665 that typically stores data on a magnetic medium such as a magnetic disk. For example, storage device 665 may store application programs and associated data files/documents. The documents may include, for example, word processing documents, spreadsheet documents, HTML (Hypertext Markup Language) documents, etc. Workstation 600 may access data stored in storage device 665 via server 660 and network 650.

Tree scrolling module 622 and GUI module 621 can be subcomponents of an operating system running on workstation 600. In another embodiment, tree scrolling module 622 and GUI module 621 can be supplementary routines of a particular application program running on workstation 600. In a further embodiment, tree scrolling module 622 and GUI module 621 are implemented as JAVA applets and stored on server 660. In such an embodiment, tree scrolling module 622 and GUI module 621 are downloaded as appropriate or as integrated components of a particular JAVA applet via network 650 to workstation 600 and are executed via a JAVA virtual machine implemented on workstation 600. An advantage of a JAVA implementation is that tree scrolling module 622 and GUI module 621 can be written and function independently of platform specific workstation 600.

In another embodiment, tree scrolling module 622 and GUI module 621 are accessed through an application programmer's interface (API) that provides a convenient encapsulation structure for invoking the tree scrolling module 622 and the GUI module 621. For example, according to one embodiment of the present invention, tree scrolling module 622 and GUI module 621 are implemented using a class structure in C++ or JAVA.

Hierarchical data 623 can be a document corresponding to a particular application such as a word processing document, a spreadsheet document, an HTML document, etc. In accordance with one embodiment of the present invention, hierarchical data 623 includes ASCII text strings stored using a tree data structure including a set of parent and child nodes. In accordance with such an embodiment, a JAVA class is used to implement the tree structure. In particular, a root node class contains a member variable consisting of an array of pointers to reference a set of child nodes. According to such an embodiment, a child node class contains a member variable pointer referencing the root/parent node. Thus, each instance of the parent node object contains a set of pointers referencing each of its child nodes, and each instance of a child node object contains a pointer referencing the parent/root node.

In one embodiment of the present invention, hierarchical data is stored using a tree data structure. In another embodiment of the present invention, hierarchical data does not reside in an explicit tree data structure. For example, hierarchical data 623 may be part of an HTML document, which HTML document can be considered to include hierarchical data because it contains a number of tagged data objects, each tagged data object occupying a distinct hierarchical position in the document. Although the HTML language does not explicitly represent a hierarchical relationship using a tree data structure, a separate software component can be implemented that parses a particular hierarchical data set or document to produce as output a tree data structure capturing the hierarchical relationships of the data.

Figure 5:
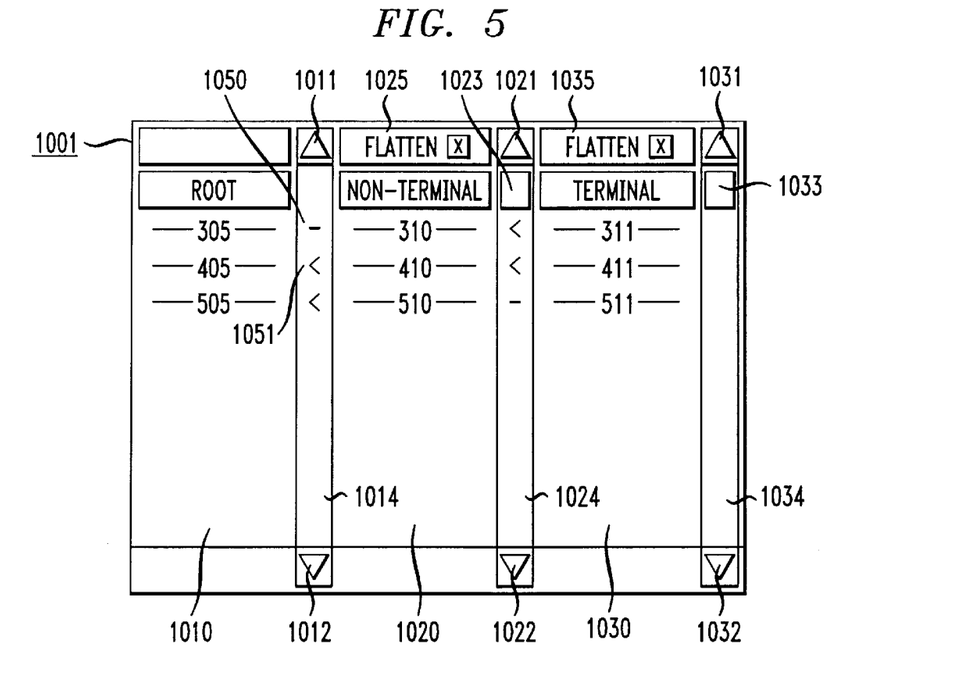
FIG. 5 illustrates a user interface with enhanced scrolling features to display and tree scroll a hierarchical data structure in accordance with one embodiment of the present invention.

FIG. 5 illustrates a user interface with enhanced scrolling features to display and tree scroll a hierarchical data structure in accordance with one embodiment of the present invention. The user interface illustrated in FIG. 5 can be implemented in a text based environment and/or a graphical environment. According to one embodiment of the present invention, the scrolling system includes a number of graphical icons, which allow control of various scrolling functions. According to one embodiment, the user interacts with these graphical icons using a mouse device by directing a cursor or selection icon over an area of a graphic icon displayed on a display device and pressing the mouse button. The user interface in FIG. 5 can be displayed on display devices such as a CRT, a video monitor, a LCD screen, a display screen of hand-held device, etc.

According to one embodiment of the present invention, a window 1000 can include a first display area 1010, a second display area 1020, and a third display area 1030, which can respectively display root nodes, non-terminal nodes, and terminal nodes. Window 1000 can include up scrolling button 1011, down scrolling button 1012, and vertical scrolling field 1014 to control the scrolling of nodes (e.g., root nodes, root data, etc.) displayed within first display area 1010. Up scrolling button 1021, down scrolling button 1022, vertical scrolling bar 1023, and vertical scrolling field 1024 can be included within window 1000 to control the scrolling of nodes (e.g., non-terminal nodes, non-terminal data, etc.) displayed within second display area 1010. Window 1000 can include up scrolling button 1031, down scrolling button 1032, vertical scrolling bar 1033, and vertical scrolling field 1034 to control the scrolling of nodes (e.g., root nodes, root data, etc.) displayed within third display area 1030.

In one embodiment, display areas 1010, 1020, and 1030 can display data of an at least three-level hierarchical data structure including parent nodes, child nodes and grandchild nodes. For example, referring to the hierarchical data illustrated in FIG. 3, node 305 can be considered a parent node, node 310 can be considered a child node, and nodes 311–313 can be considered grandchild nodes. Examples of multi-level hierarchical data that can be displayed in accordance with embodiments of the present invention includes music data (e.g., artist, album, and song data), multimedia data (e.g., publication, publication date, and publication segment; network, show, and episode; show, season and episode; etc.), multi-level financial data, e-mail data (e.g., e-mail sender, e-mail sent date, and e-mail subject, etc.), other hierarchical data known in the art, etc.

In an embodiment in accordance with the present invention, window 1000 can display portions of the hierarchical data illustrated in FIG. 3. Root nodes 305, 405 and 505 can be displayed within first display area 1010. In one embodiment, each of root nodes 305, 405 and 505 have at least one child node (e.g., a non-terminal node, etc.). A computer controlling in part the display of window 1000 (e.g., workstation 600 and/or server 660 of FIG. 4, etc.) can determine that at most one child node of root nodes 305, 405, and 505 is to be displayed within second display area 1020. In one embodiment, window 1000 includes a first flatten enable 1025. When first flatten enable 1025 is selected (e.g., by clicking on first flatten enable 1025 such that an enable indication is displayed (e.g., an X within a box, etc.)), then at most one child node (e.g., non-terminal node) of each displayed root node is to be displayed within second display area 1020.

When at most one child node of each displayed root node is to be displayed within second display area 1020, then the computer controlling at least in part the display of window 1000 can determine which child node of a root node is to be displayed when the root node has more than one child node. In one embodiment, the computer receives a child node scrolling instruction, e.g., a user moves vertical scrolling bar 1023 up or down within vertical scrolling field 1024, user clicks on up scrolling button 1023, down scrolling button 1024, etc. Based on the child node scrolling instruction, the computer can determine a child node display percentile and select one child node based on the child node display percentile.

The child node display percentile can be based on the position of the vertical scrolling bar 1023 with the vertical scrolling field 1024. The child node display percentile can have a value of 0 to 100 based on the position of the vertical scrolling bar 1023 within the vertical scrolling field 1024, e.g., have a value of zero when the vertical scrolling bar is at the top of vertical scrolling field 1024, have a value of 100 when the vertical scrolling bar is at the bottom of vertical scrolling field 1024, have a value of 33 when the vertical scrolling bar is one third of the way down vertical scrolling field 1024, have a value of 50 when the vertical scrolling bar is halfway down the vertical scrolling field 1024, have a value of 75 when the vertical scrolling bar is three-quarters of the way down the vertical scrolling field 1024, etc. In another embodiment, a user can enter a child node scrolling instruction by entering a number (e.g., a number zero to one hundred), by manipulating graphical control icons, etc.

The following table, Table 1, illustrates how, in one embodiment, a child node is proportionally selected based on the child node display percentile. When a node is proportionally selected, the amount of scrolling (e.g., amount of movement of a vertical scrolling bar 1023 within vertical scrolling field 1024) to cause the display of a next child node of a group of child nodes of a parent can be proportionate to the number of child nodes of the parent node. For example, in one embodiment, scrolling the vertical scroll bar 1023 from the top (e.g., display percentile ("DP") of zero) to one-third down (e.g., DP of 33) will not change the selection of the first node of two nodes, or the selection of the first node of three nodes, but will change the selection of the second node of four nodes and the selection of the second node of five nodes.

TABLE 1

|  | 1 Node | 2 Nodes | 3 Nodes | 4 Nodes | 5 Nodes |
| --- | --- | --- | --- | --- | --- |
| Select First Node | $0 \leq DP \leq 100$ | $0 \leq DP \leq 50$ | $0 \leq DP \leq 33$ | $0 \leq DP \leq 25$ | $0 \leq DP \leq 20$ |
| Select Second Node | — | $50 < DP \leq 100$ | $33 < DP \leq 67$ | $24 < DP \leq 50$ | $20 < DP \leq 40$ |
| Select Third Node | — | — | $67 < DP \leq 100$ | $50 < DP \leq 75$ | $40 < DP \leq 60$ |
| Select Fourth Node | — | — | — | $75 < DP \leq 100$ | $60 < DP \leq 80$ |
| Select Fifth Node | — | — | — | — | $80 < DP \leq 100$ |

The following table, Table 2, illustrates how, in one embodiment, a child node is arithmetically selected based on the child node display percentile. When a node is arithmetically selected, the amount of scrolling (e.g., amount of movement of a vertical scrolling bar 1023 within vertical scrolling field 1024) to cause the display of a next child node of a group of child nodes of a parent can be a set arithmetic amount for each node. For example, in one embodiment, scrolling the vertical scroll bar 1023 from the top (e.g., display percentile ("DP") of zero) to just over one-fifth down (e.g., DP of 20) will cause the selection of the second child node in each instance where a parent node has between two and five nodes.

a non-terminal node is to be displayed when the non-terminal node has more than one child node. In one embodiment, the computer receives a grandchild node scrolling instruction, e.g., a user moves vertical scrolling bar 1033 up or down within vertical scrolling field 1034, user clicks on up scrolling button 1033, down scrolling button 1034, etc. Based on the grandchild node scrolling instruction, the computer can determine a grandchild node display percentile and select one grandchild node (e.g., a terminal node) based on the grandchild node display percentile.

The grandchild node display percentile can be based on the position of the vertical scrolling bar 1033 with the vertical scrolling field 1034. The grandchild node display percentile can have a value of 0 to 100 based on the position of the vertical scrolling bar 1033 within the vertical scrolling field 1034, e.g., have a value of zero when the vertical scrolling bar is at the top of vertical scrolling field 1034,

TABLE 2

|  | 1 Node | 2 Nodes | 3 Nodes | 4 Nodes | 5 Nodes |
| --- | --- | --- | --- | --- | --- |
| Select First Node | $0 \leq DP \leq 100$ | $0 \leq DP \leq 20$ | $0 \leq DP \leq 20$ | $0 \leq DP \leq 20$ | $0 \leq DP \leq 20$ |
| Select Second Node | — | $20 < DP \leq 100$ | $20 < DP \leq 40$ | $20 < DP \leq 40$ | $20 < DP \leq 40$ |
| Select Third Node | — | — | $40 < DP \leq 100$ | $40 < DP \leq 100$ | $40 < DP \leq 100$ |
| Select Fourth Node | — | — | — | $60 < DP \leq 100$ | $60 < DP \leq 100$ |
| Select Fifth Node | — | — | — | — | $80 < DP \leq 100$ |

After one child node of a parent node has been selected, that selected one child node can be displayed in association with the parent node of the child node. In one embodiment, and as shown in FIG. 5, a selected child node (e.g., a non-terminal node) is displayed in a same row as the parent node (e.g., a root node). In FIG. 5, the vertical scrolling button 1023 is in a top position, and each first non-terminal node of root nodes 305, 405 and 505 are displayed, i.e., non-terminal nodes 310, 410, and 510.

In one embodiment, each of non-terminal nodes 310, 410 and 510 have at least one child node (e.g., a terminal node, a grandchild node of a root node, etc.). A computer controlling in part the display of window 1000 (e.g., workstation 600 and/or server 660 of FIG. 4, etc.) can determine that at most one child node of non-terminal nodes 31, 410, and 510 is to be displayed within third display area 1030. In one embodiment, window 1000 includes a second flatten enable 1035. When second flatten enable 1035 is selected (e.g., by clicking on second flatten enable 1035 such that an enable indication is displayed (e.g., an X within a box, etc.)), then at most one child node (e.g., a terminal node) of each displayed non-terminal node is to be displayed within third display area 1030.

When at most one child node of each displayed non-terminal node is to be displayed within third display area 1030, then the computer controlling at least in part the display of window 1000 can determine which child node of have a value of 100 when the vertical scrolling bar is at the bottom of vertical scrolling field 1034, have a value of 33 when the vertical scrolling bar is one third of the way down vertical scrolling field 1034, have a value of 50 when the vertical scrolling bar is halfway down the vertical scrolling field 1034, have a value of 75 when the vertical scrolling bar is three-quarters of the way down the vertical scrolling field 1034, etc. In another embodiment, a user can enter a grandchild node scrolling instruction by entering a number (e.g., a number zero to one hundred), by manipulating graphical control icons, etc.

One child node of each displayed non-terminal node (e.g., a terminal node, a grandchild node of a root node, etc.) can be selected based on the grandchild node display percentile. In one embodiment, the one child node of each displayed non-terminal node can be proportionally selected based on the grandchild node display percentile. In another embodiment, the one child node of each displayed non-terminal node can be arithmetically selected based on the grandchild node display percentile.

After one child node of each displayed non-terminal node has been selected, that selected one child node can be displayed in association with the parent node of the child node (e.g., a terminal node can be displayed as associated with its parent non-terminal node, a grandchild node can be displayed as associated with its parent child node, etc.). In one embodiment, and as shown in FIG. 5, a selected one child node of each displayed non-terminal node (e.g., a terminal node) is displayed in a same row as its parent non-terminal node. In FIG. 5, the vertical scrolling button 1033 is in a top position, and each first terminal nodes of non-terminal nodes 310, 410 and 510 are displayed, i.e., terminal nodes 311,411, and 511.

Window 1000, in one embodiment and as illustrated in FIG. 5, can include child node descriptors 1050, 105 1. A child node descriptor can be displayed in association with a parent node (e.g., in association with root nodes 305, 405, 505; in association with non-terminal nodes 310, 410, 510; etc.) to indicate what proportion of child nodes of the parent node is displayed. For example, in FIG. 5, the child node descriptor 1050 displayed between root node 305 and non-terminal node 310 can indicate that the child node 310 is the only child node of root node 305. The child node descriptor 1051 displayed between root node 405 and non-terminal node 410 can indicate that the child node 410 is one of a plurality of child nodes of root node 405 (e.g., child nodes 410, 420 as illustrated in FIG. 3).

Figure 6:
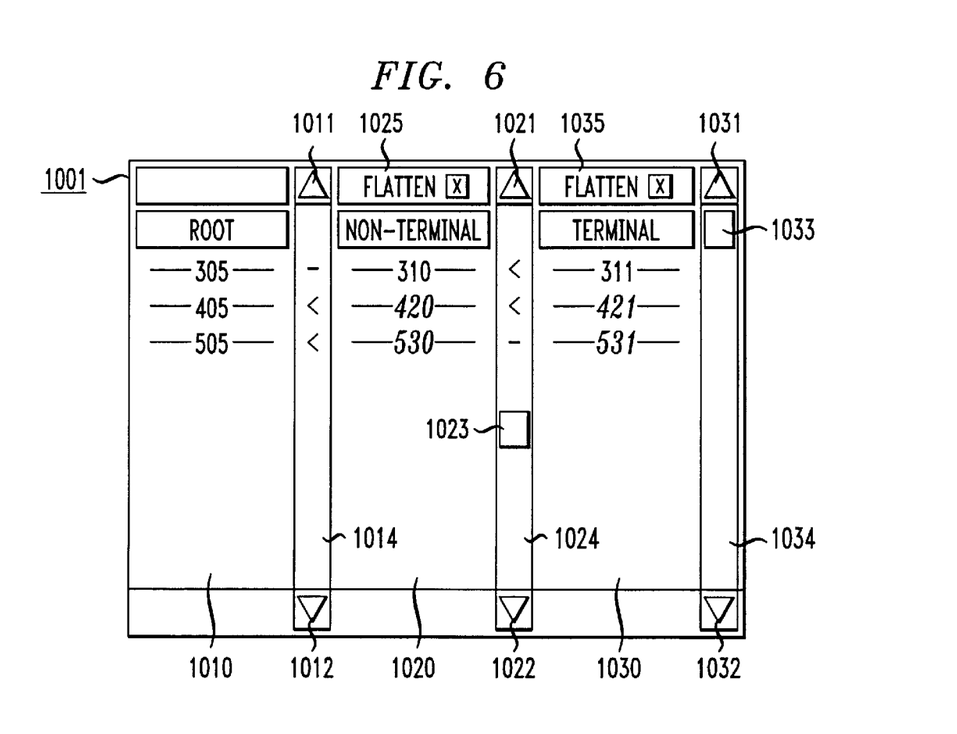
FIG. 6 shows a user interface in accordance with an embodiment of the present invention after a scrolling operation has been performed.

FIG. 6 shows a user interface in accordance with an embodiment of the present invention after a scrolling operation has been performed. Vertical scrolling bar 1023 has been moved to a position just more than half way down vertical scrolling field 1024 (e.g., by dragging vertical scrolling bar 1023, by clicking down scrolling button 1022 a number of times, etc.). In response to that child node scrolling instruction, a child node display percentile can be calculated (e.g., a DP of 55) and the appropriate child nodes of root nodes 305, 405 and 505 can be selected and displayed. In the embodiment illustrated in FIG. 6, the child nodes are proportionally selected and the second child node (i.e., non-terminal node 420) of root node 405 and the third child node (i.e., non-terminal node 530) of root node 505 are now displayed in second display area 1020. Each of the first child nodes (i.e., terminal nodes 421, 531) of non-terminal nodes 420, 530 are now displayed in third display area 1030 because non-terminal nodes 420, 530 are now displayed in second display area 1020, and (ii) the vertical scrolling button 1033 is positioned at the top of vertical scrolling field 1033. The nodes displayed in FIG. 6, but not displayed in FIG. 5, are displayed in FIG. 6 with a larger font to better identify nodes displayed as a result of the scrolling operation. In other embodiments of the present invention, newly displayed nodes are displayed in the same font as previously displayed nodes.

Figure 7:
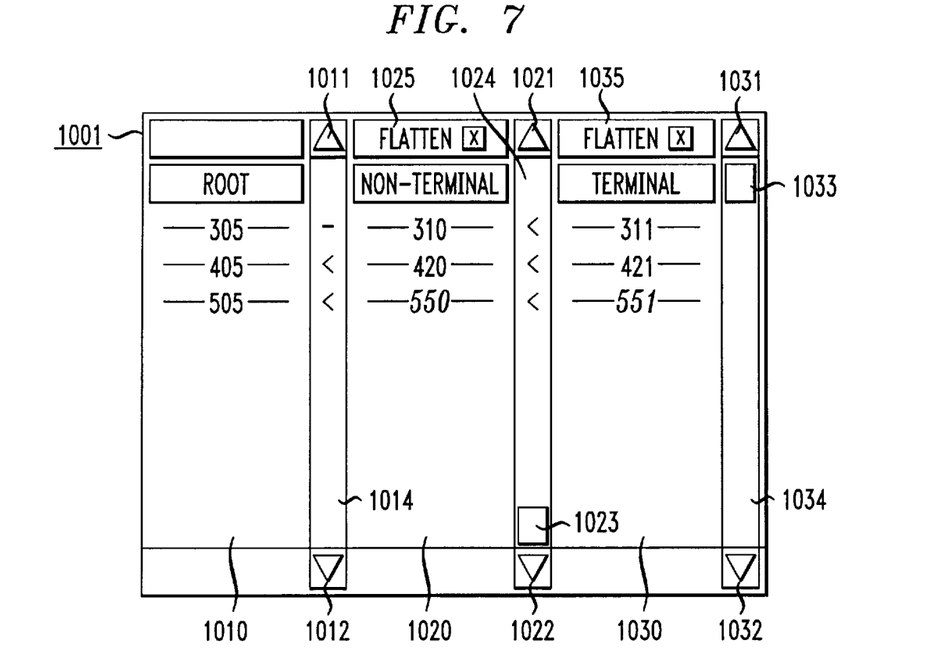
FIG. 7 shows a user interface in accordance with an embodiment of the present invention after a scrolling operation has been performed.

FIG. 7 shows a user interface in accordance with an embodiment of the present invention after a scrolling operation has been performed. Vertical scrolling bar 1023 has been moved to a position all the way down vertical scrolling field 1024. In response to that child node scrolling instruction, a child node display percentile can be calculated (e.g., a DP of 100) and the appropriate child nodes of root nodes 305, 405 and 505 can be selected and displayed. In the embodiment illustrated in FIG. 7, the child nodes are proportionally selected and the fifth child node (i.e., non-terminal node 550) of root node 505 is now displayed in second display area 1020. The first child node (i.e., terminal node 551) of non-terminal node 550 is now displayed in third display area 1030 because (i) non-terminal node 550 is now displayed in second display area 1020, and (ii) the vertical scrolling button 1033 is positioned at the top of vertical scrolling field 1033. The nodes displayed in FIG. 7, but not displayed in FIG. 6, are displayed in FIG. 7 with a larger font to better identify nodes displayed as a result of the scrolling operation. In other embodiments of the present invention, newly displayed nodes are displayed in the same font as previously displayed nodes.

Figure 8:
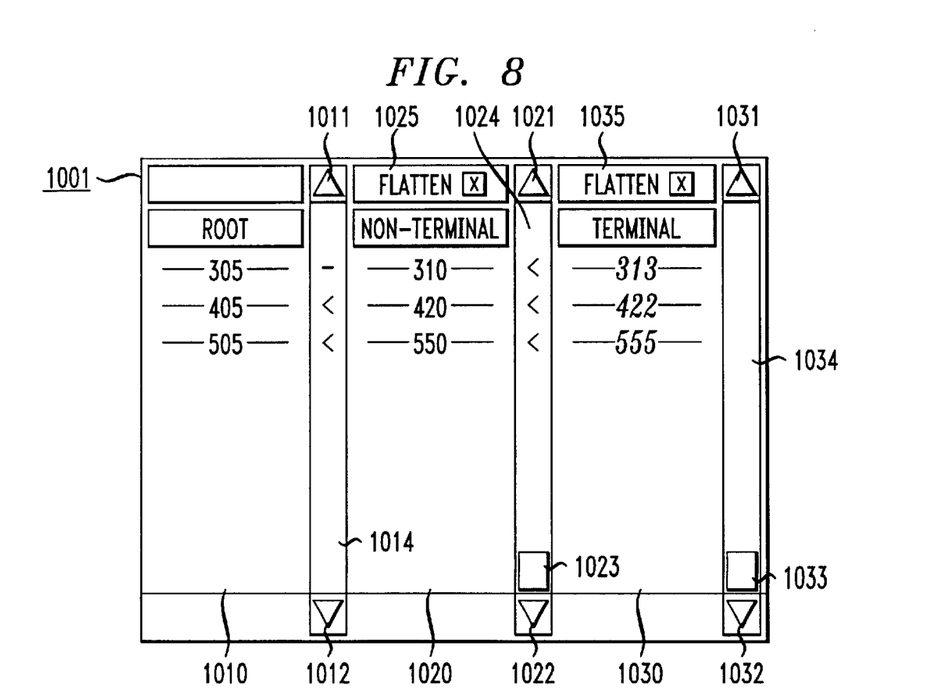
FIG. 8 shows a user interface in accordance with an embodiment of the present invention after a scrolling operation has been performed.

FIG. 8 shows a user interface in accordance with an embodiment of the present invention after a scrolling operation has been performed. Vertical scrolling bar 1033 has been moved to a position all the way down vertical scrolling field 1034. In response to that grandchild node scrolling instruction, a grandchild node display percentile can be calculated (e.g., a DP of 100) and the appropriate grandchild nodes of root nodes 305, 405 and 505 can be selected and displayed. In the embodiment illustrated in FIG. 8, the nodes are proportionally selected and each of the last child nodes (i.e., terminal nodes 313, 422, and 555) of non-terminal nodes 310, 420 and 555 are displayed in third display area 1030. The nodes displayed in FIG. 8, but not displayed in FIG. 7, are displayed in FIG. 8 with a larger font to better identify nodes displayed as a result of the scrolling operation. In other embodiments of the present invention, newly displayed nodes are displayed in the same font as previously displayed nodes.

Figure 9:
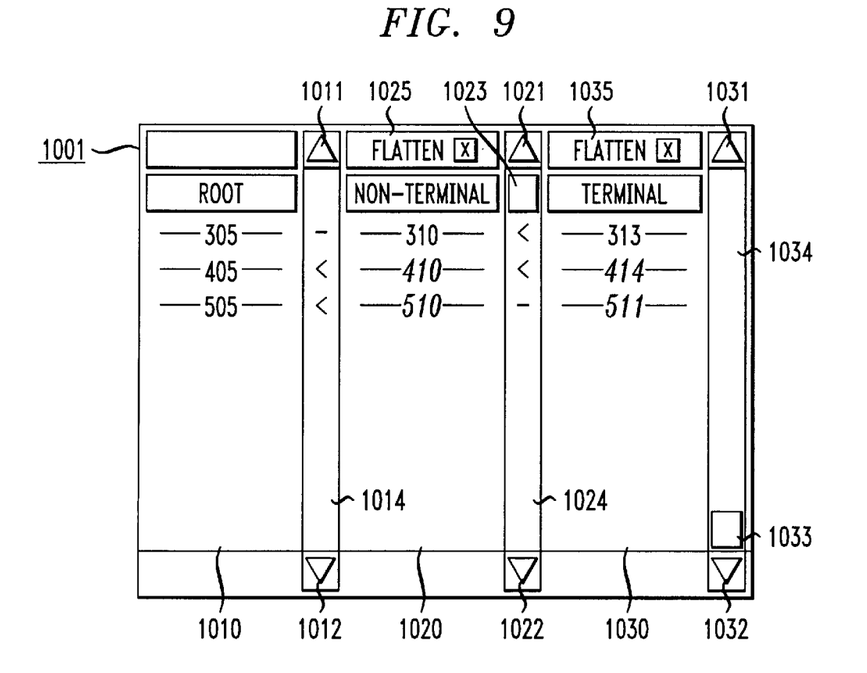
FIG. 9 shows a user interface in accordance with an embodiment of the present invention after a scrolling operation has been performed.

FIG. 9 shows a user interface in accordance with an embodiment of the present invention after a scrolling operation has been performed. Vertical scrolling bar 1023 has been moved to a position at the top of vertical scrolling field 1024. In response to that child node scrolling instruction, a child node display percentile can be calculated (e.g., a DP of 0) and the appropriate child nodes of root nodes 305, 405 and 505 can be selected and displayed. In the embodiment illustrated in FIG. 9, the child nodes are proportionally selected and the first child nodes (i.e., non-terminal nodes 410 and 510) of root nodes 405, 505 are displayed in second display area 1020. The last child nodes (i.e., terminal nodes 414, 511) of non-terminal nodes 410, 510 are now displayed in third display area 1030 because (i) non-terminal nodes 410, 510 are now displayed in second display area 1020, and (ii) the vertical scrolling button 1033 is positioned at the bottom of vertical scrolling field 1033. The nodes displayed in FIG. 9, but not displayed in FIG. 8, are displayed in FIG. 9 with a larger font to better identify nodes displayed as a result of the scrolling operation. In other embodiments of the present invention, newly displayed nodes are displayed in the same font as previously displayed nodes.

Figure 10:
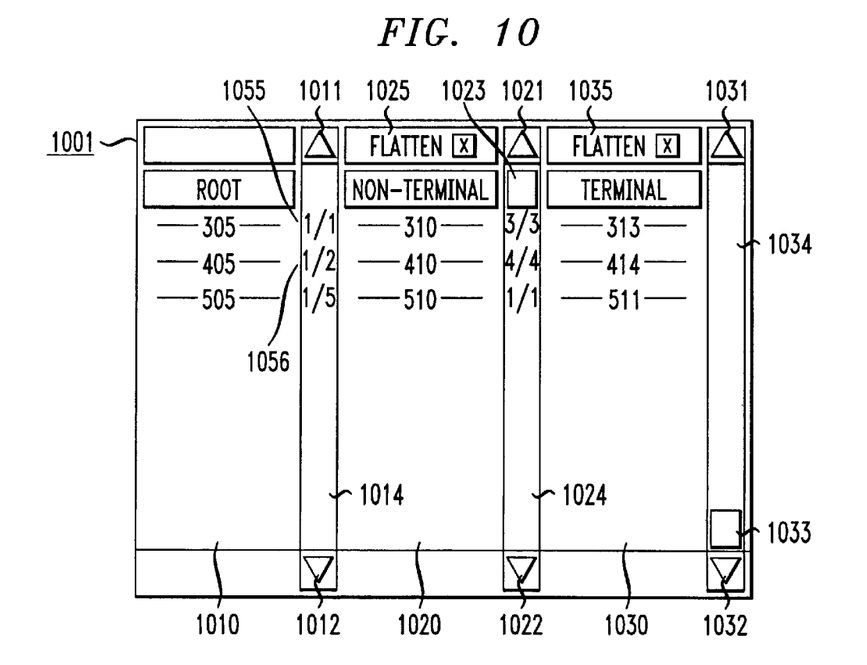
FIG. 10 shows another embodiment of child node descriptors in accordance with an embodiment of the present invention.

FIG. 10 shows another embodiment of child node descriptors in accordance with an embodiment of the present invention. Window 1000, in one embodiment and as illustrated in FIG. 10, can include child node descriptors 1055, 1056. A child node descriptor can be displayed in association with a parent node (e.g., in association with root nodes 305, 405, 505; in association with non-terminal nodes 310, 410, 510; etc.) to indicate which child node of a plurality of child nodes is displayed and the total quantity of child nodes of a parent node. For example, in FIG. 10, the child node descriptor 1055 displayed between root node 305 and non-terminal node 310 can indicate that the child node 310 is the first and only child node of root node 305 (e.g., is child node 1 of 1). The child node descriptor 1056 displayed between root node 405 and non-terminal node 410 can indicate that the child node 410 is the first child node of two child nodes of root node 405 (e.g., is child node 1 of 2).

Figure 11:
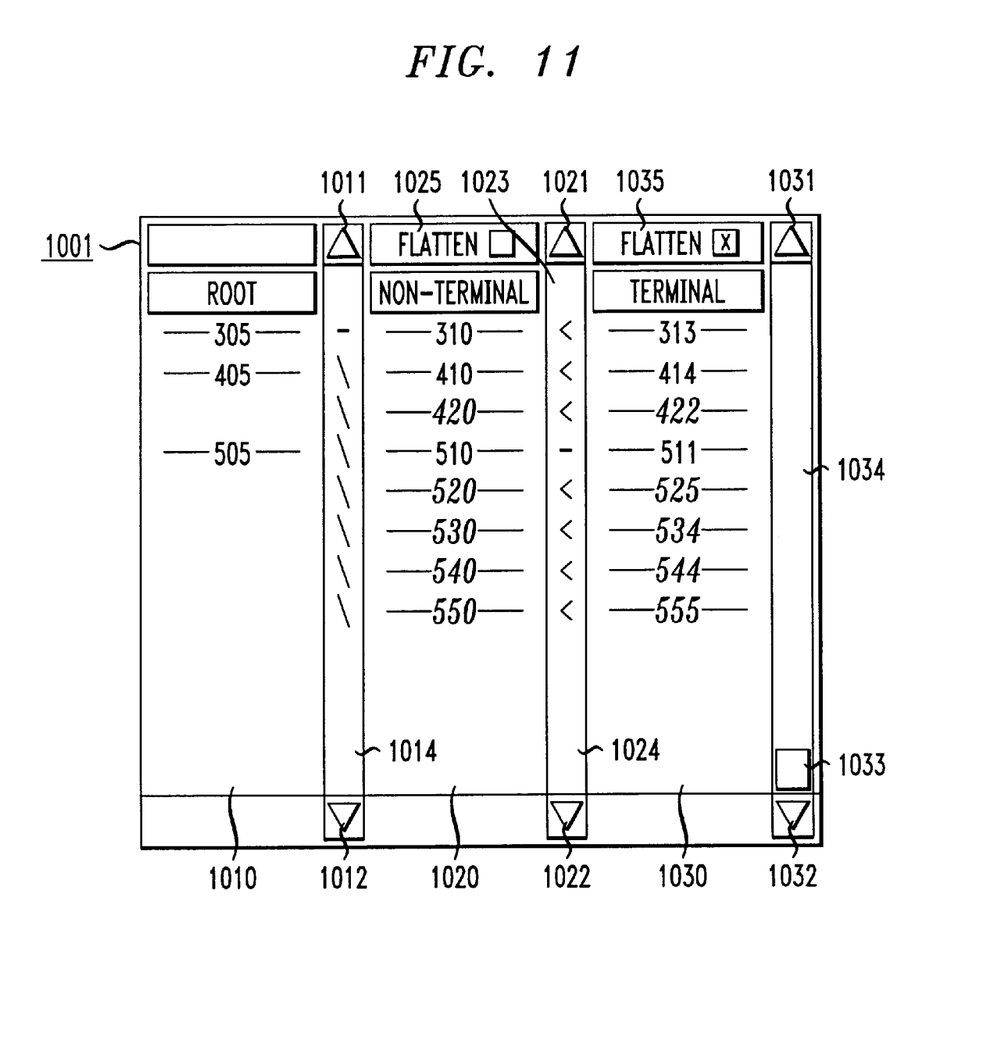
FIG. 11 shows a user interface in accordance with an embodiment of the present invention after an instruction to display each displayable node has been performed.

FIG. 11 shows a user interface in accordance with an embodiment of the present invention after an instruction to display each displayable node has been performed. A user can instruct the computer displaying a user interface in accordance with an embodiment of the present invention (e.g., the user interface illustrated in FIG. 9) to display each displayable non-terminal node of root nodes 305, 405, and 505 by unselecting first flatten enable 1025 (e.g., by clicking on first flatten enable 1025 such that the enable indication is no longer displayed (e.g., no X is displayed within the box, etc.)). In response, each displayable non-terminal node of root nodes 305, 405 and 505 can be displayed in second display area 1020. In the embodiment illustrated in FIG. 11, non-terminal nodes 420, 520, 530, 540 and 550 are now displayed in second display area 1020, respectively with terminal nodes 422, 525, 534, 544, 555 (i.e., the last terminal nodes of each of the non-terminal nodes 420, 520, 530, 540 and 550 because the vertical scrolling button 1033 is positioned at the bottom of vertical scrolling field 1033) displayed in third display area 1030. The nodes displayed in FIG. 11, but not displayed in FIG. 9, are displayed in FIG. 11 with a larger font to better identify nodes displayed as a result of the operation to display each displayable node. In other embodiments of the present invention, newly displayed nodes are displayed in the same font as previously displayed nodes.

Figure 12:
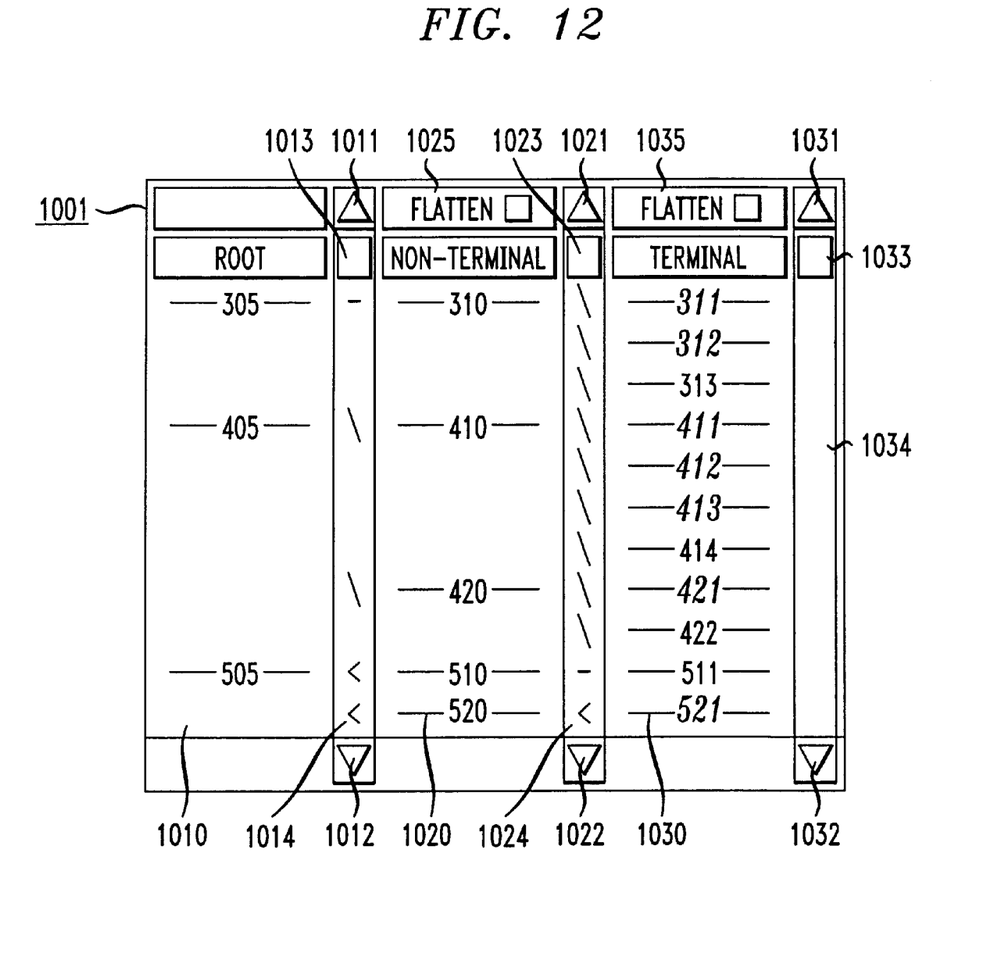
FIG. 12 shows a user interface in accordance with an embodiment of the present invention after an instruction to display each displayable node has been performed.

FIG. 12 shows a user interface in accordance with an embodiment of the present invention after an instruction to display each displayable node has been performed. A user can instruct the computer displaying a user interface in accordance with an embodiment of the present invention (e.g., the user interface illustrated in FIG. 11) to display each displayable terminal node of the displayable non-terminal nodes by unselecting second flatten enable 1035 (e.g., by clicking on second flatten enable 1035 such that the enable indication is no longer displayed (e.g., no X is displayed within the box, etc.)). In response, each displayable terminal node of non-terminal nodes 310, 410, 420, 510, 520, 530, 540, and 550 can be displayed in third display area 1030.

In the embodiment illustrated in FIG. 12, the received instruction to displaying each displayable terminal node results in certain non-terminal and terminal nodes no longer being displayed (e.g., non-terminal nodes 530, 540 and 550; the terminal nodes of non-terminal nodes 530, 540 and 550; and terminal nodes 522, 523, 524 and 525 of non-terminal node 521). Because all of the non-terminal nodes of the displayed root nodes cannot be displayed, vertical scrolling bar 1013 is displayed to allow scrolling of the displayed root nodes. Vertical scrolling bars 1023 and 1033 are displayed to control which non-terminal and terminal nodes are displayed. With each of vertical scrolling bars 1023, 1033 at the top of their respective vertical scrolling fields, the display of displayable non-terminal nodes and terminal nodes commences with the first displayable non-terminal and terminal nodes.

In the embodiment illustrated in FIG. 12, terminal nodes 311, 312, 411, 412, 413, 421, and 521 are now displayed. The child node descriptors displayed to the left of non-terminal nodes 510 and 520 indicate that less than all of the non-terminal nodes of root node 505 are displayed. The child node descriptors displayed to the left of terminal node 521 indicates that less than all of the terminal nodes of non-terminal node 520 are displayed. The nodes displayed in FIG. 12, but not displayed in FIG. 11, are displayed in FIG. 12 with a larger font to better identify nodes displayed as a result of the operation to display each displayable node. In other embodiments of the present invention, newly displayed nodes are displayed in the same font as previously displayed nodes.

Figure 13:
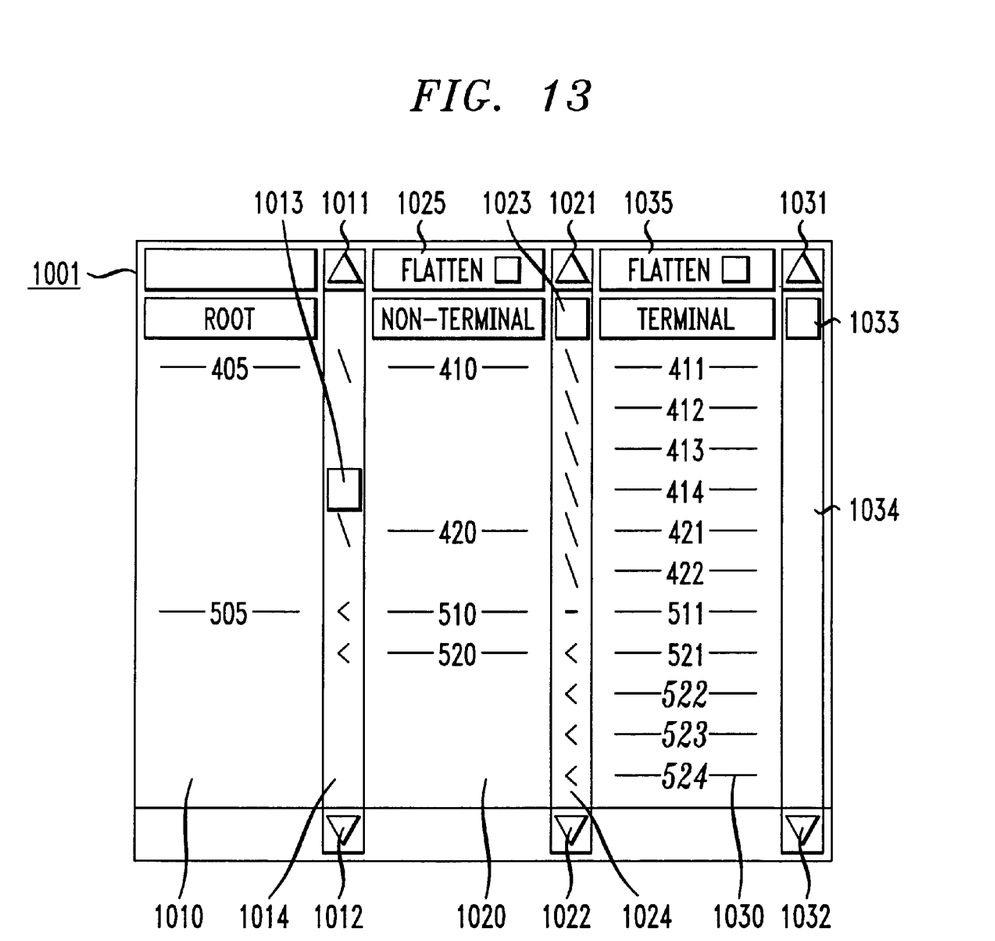
FIG. 13 shows a user interface in accordance with an embodiment of the present invention after a scrolling operation has been performed.

FIG. 13 shows a user interface in accordance with an embodiment of the present invention after a scrolling operation has been performed. Vertical scrolling bar 1013 has been moved to a position over one-third of the way down vertical scrolling field 1014. In response to that root node scrolling instruction, root node 305 can be scrolled out of first display area 1010 such that root nodes 405 and 505 are the only root nodes displayed within first display area 1010. Additional terminal nodes of non-terminal node 520 (i.e., terminal nodes 522, 523, and 524) can now be displayed in third display area 1030. The nodes displayed in FIG. 13, but not displayed in FIG. 12, are displayed in FIG. 13 with a larger font to better identify nodes displayed as a result of the scrolling operation. In other embodiments of the present invention, newly displayed nodes are displayed in the same font as previously displayed nodes.

Figure 14:
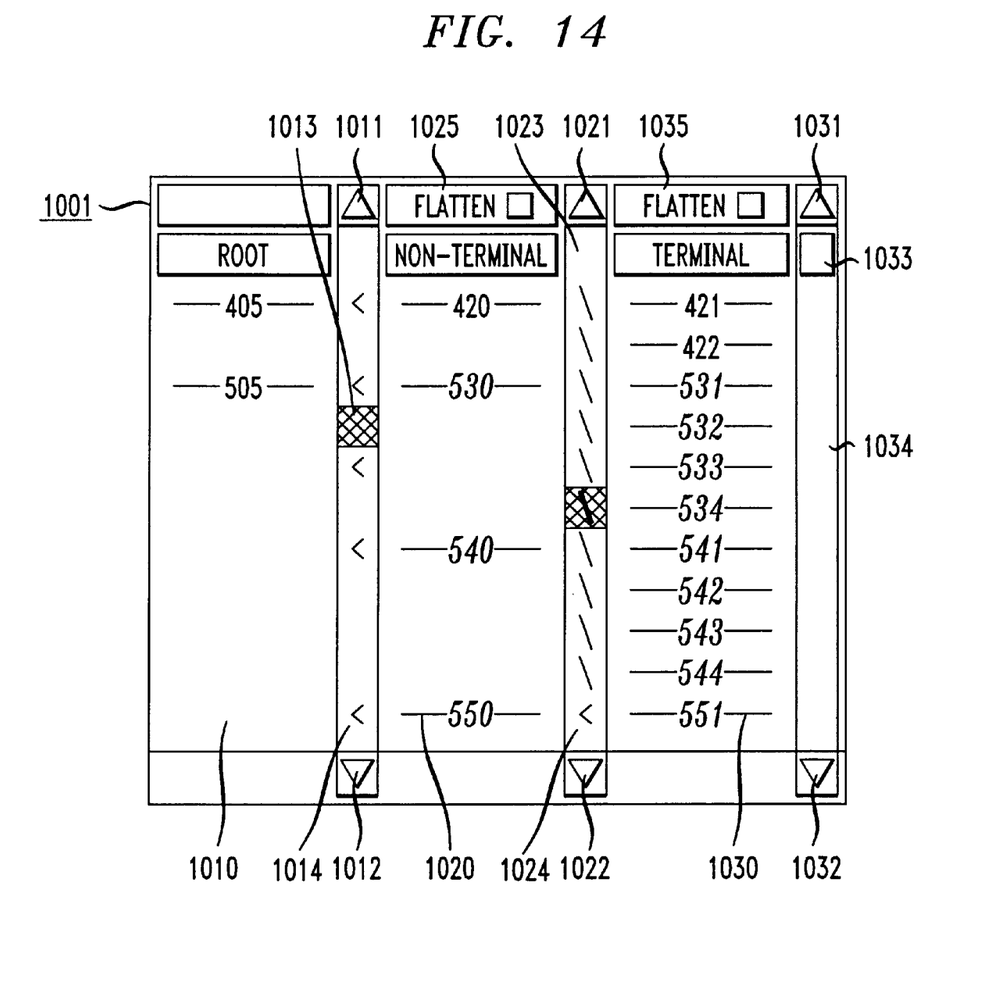
FIG. 14 shows a user interface in accordance with an embodiment of the present invention after a scrolling operation has been performed.

FIG. 14 shows a user interface in accordance with an embodiment of the present invention after a scrolling operation has been performed. Vertical scrolling bar 1023 has been moved to a position over halfway down vertical scrolling field 1024. In response to that child node scrolling instruction, a child node display percentile can be calculated (e.g., a DP of 55) and the appropriate child nodes of root nodes 405 and 505 can be selected as the first child node of the displayable child nodes to be displayed. In the embodiment illustrated in FIG. 14, the first child nodes are proportionally selected and the first child nodes of the displayable child nodes to be displayed (i.e., non-terminal nodes 420 and 530) of root nodes 405, 505 are displayed in second display area 1020, along with any subsequent displayable non-terminal nodes of root nodes 405, 505 (i.e., non-terminal nodes 540 and 550). The first and every subsequent child nodes (i.e., terminal nodes 531–534, 541–544, and 551) of non-terminal nodes 530, 540 and 550 are now displayed in third display area 1030 because (i) non-terminal nodes 530, 540 and 550 are now displayed in second display area 1020, and (ii) the vertical scrolling button 1033 is positioned at the top of vertical scrolling field 1033. The nodes displayed in FIG. 14, but not displayed in FIG. 13, are displayed in FIG. 14 with a larger font to better identify nodes displayed as a result of the scrolling operation. In other embodiments of the present invention, newly displayed nodes are displayed in the same font as previously displayed nodes.

Figure 15:
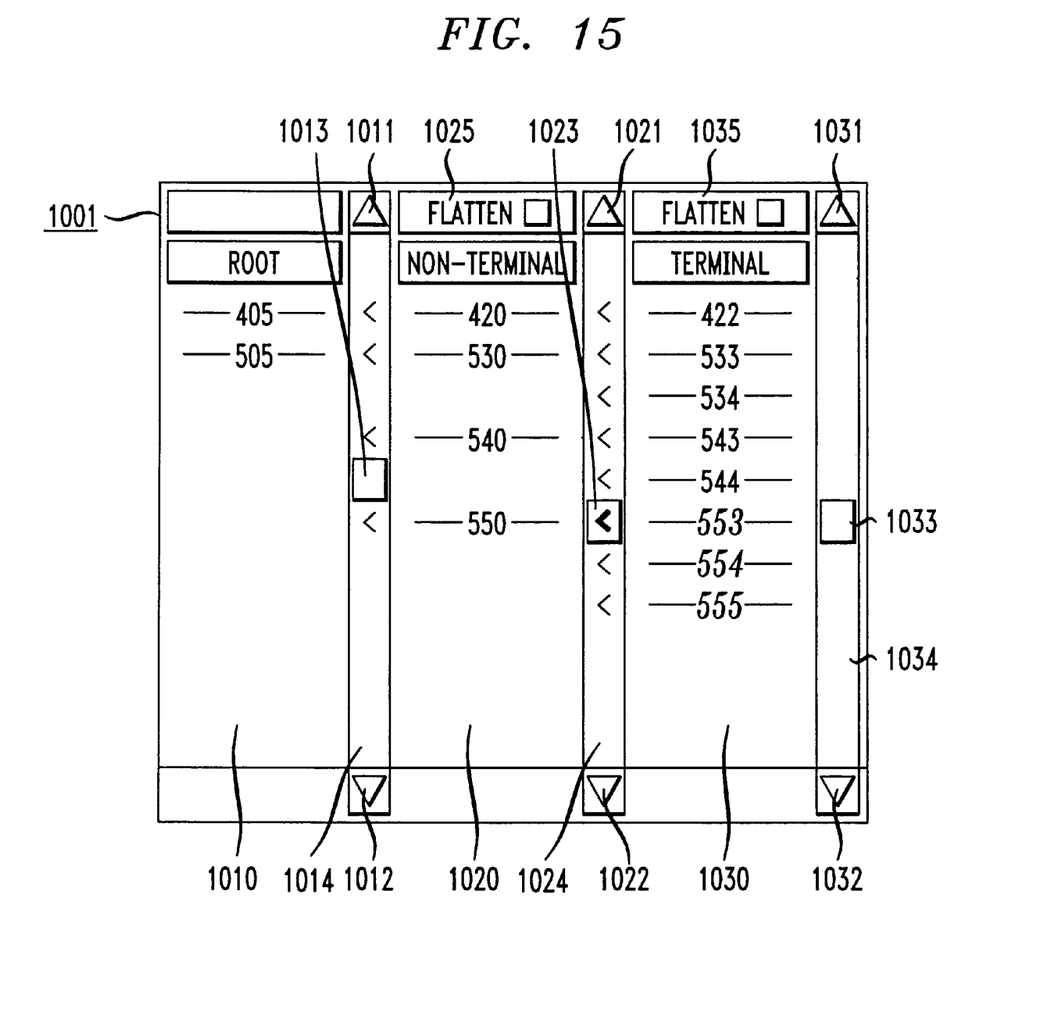
FIG. 15 shows a user interface in accordance with an embodiment of the present invention after a scrolling operation has been performed.

FIG. 15 shows a user interface in accordance with an embodiment of the present invention after a scrolling operation has been performed. Vertical scrolling bar 1033 has been moved to a position over halfway down vertical scrolling field 1034. In response to that grandchild node scrolling instruction, a grandchild node display percentile can be calculated (e.g., a DP of 55) and the appropriate terminal nodes of non-terminal nodes 420, 530, 540, and 550 can be selected as the first terminal node of the displayable terminal nodes to be displayed. In the embodiment illustrated in FIG. 15, the first terminal nodes are proportionally selected and the first terminal nodes of the displayable terminal nodes to be displayed ((i.e., terminal nodes 422, 533, 543, and 553) of non-terminal nodes 420, 530, 540 and 550 are displayed in the third display area 1030, along with any subsequent displayable terminal nodes of non-terminal nodes 420, 530, 540 and 550 (i.e., non-terminal nodes 534, 544, 554, and 555). The nodes displayed in FIG. 15, but not displayed in FIG. 14, are displayed in FIG. 15 with a larger font to better identify nodes displayed as a result of the scrolling operation. In other embodiments of the present invention, newly displayed nodes are displayed in the same font as previously displayed nodes.

In accordance with one embodiment of the present invention, instructions adapted to be executed by a processor to perform a method in accordance with an embodiment of the present invention are stored on a computer-readable medium and distributed as software. The computer-readable medium can be a device that stores digital information. For example, a computer-readable medium includes a portable magnetic disk, such as a floppy disk; or a Zip® disk, manufactured by the Iomega Corporation of Roy, Utah (Zip® is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

Embodiments of the present invention advantageously allow the display and scrolling of hierarchical data including parent, child and grandchild nodes (e.g., root, non-terminal, and terminal nodes; etc.). Embodiments of the present invention allow for only one non-terminal node of a root node to be displayed along with only one terminal node of the displayed non-terminal node. A user can selectively scroll through the non-terminal nodes of the displayed root nodes and through the terminal nodes of the displayed non-terminal nodes. A user can instruct that all displayable child nodes of a displayable parent node be displayed. Child node descriptors can indicate the proportion of child nodes that are displayed of all the child nodes of a parent node. Embodiment of the present invention advantageously allow hierarchical relationships between data to be efficiently and economically conveyed to a user viewing the hierarchical data.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A method for displaying hierarchical data, the method comprising:
   displaying a plurality of parent nodes within a first display area, each displayed parent node of the plurality of parent nodes having at least one child node;
   determining that at most one child node for each displayed parent node of the plurality of parent nodes is to be displayed;
   receiving a child node scrolling instruction;
   determining a child node display percentile based at least in part on the child node scrolling instruction;
   selecting one child node of each displayed parent node of the plurality of parent nodes based at least in part on the determined child node display percentile; and
   displaying each selected one child node of each displayed parent node of the plurality of parent nodes in a second display area, each displayed child node being displayed as associated with the displayed parent node of the displayed child node.

2. The method of claim 1, the method further comprising:
   displaying a child node descriptor for each displayed parent node of the plurality of parent nodes, each child node descriptor indicating one of at least two conditions, the at least two conditions including
      a first condition that a displayed child node is the only child node of the displayed parent node, and
      a second condition that a displayed child node is one of a plurality of child nodes of the displayed parent node.

3. The method of claim 1, the method further comprising:
   displaying a child node descriptor for each displayed parent node of the plurality of parent nodes, each child node descriptor including a first descriptor associated with the displayed child node and a second descriptor corresponding to a total quantity of child nodes of the displayed parent node of the displayed child node.

4. The method of claim 1, wherein selecting one child node of each displayed parent node of the plurality of parent nodes based at least in part on the determined child node display percentile includes proportionally selecting one child node of each displayed parent node of the plurality of parent nodes based at least in part on the determined child node display percentile.

5. The method of claim 1, wherein selecting one child node of each displayed parent node of the plurality of parent nodes based at least in part on the determined child node display percentile includes arithmetically selecting one child node of each displayed parent node of the plurality of parent nodes based at least in part on the determined child node display percentile.

6. The method of claim 1, wherein each displayed child node has at least one grandchild node.

7. The method of claim 6, the method further comprising:
   determining that at most one grandchild node for each displayed child node is to be displayed;
   receiving a grandchild node scrolling instruction;
   determining a grandchild node display percentile based at least in part on the received grandchild node scrolling instruction;
   selecting one grandchild node of each displayed child node based at least in part on the determined grandchild node display percentile; and
   displaying each selected one grandchild node of each displayed child node in a third display area, each displayed grandchild node being displayed as associated with the displayed child node to which the displayed grandchild node is related.

8. The method of claim 1, the method further comprising:
   receiving an instruction to display each displayable child node of each displayed parent node; and
   displaying each displayable child node of each displayed parent node.

9. The method of claim 8, further comprising: displaying a per-child node descriptor for each displayed child node, each per-child node descriptor indicating one of at least two per-child conditions, the at least two per-child conditions including
   a first per-child condition that all child nodes of the displayed parent node are displayed, and
   a second per-child condition that fewer than all child nodes of the displayed parent node are displayed.

10. The method of claim 7, the method further comprising:
    receiving an instruction to display each displayable child node of each displayed parent node;
    displaying each displayable child node of each displayed parent node;
    receiving an instruction to display each displayable grandchild node of each displayed child node; and
    displaying each displayable grandchild node of each displayed child node.

11. A method for displaying hierarchical data, the method comprising:
    displaying a root node within a first display area;
    determining that at most one non-terminal node of the root node is to be displayed in a second display area;
    receiving a non-terminal node scrolling instruction;
    determining a non-terminal node display percentile based at least in part on the received non-terminal node scrolling instruction;

selecting one non-terminal node of the root node based at least in part on the determined non-terminal node display percentile;

displaying the selected one non-terminal node of the root node;

determining that at most one terminal node of the non-terminal node is to be displayed in a third display area;

receiving a terminal node scrolling instruction;

determining a terminal node display percentile based at least in part on the received terminal node scrolling instruction;

selecting one terminal node of the non-terminal node based at least in part on the determined terminal node display percentile; and displaying the selected one terminal node of the non-terminal node.

12. The method of claim 11, the method further comprising:

receiving an instruction to display each displayable non-terminal node of the displayed root node; and displaying each displayable non-terminal node of each displayed root node.

13. The method of claim 12, the method further comprising:

receiving an instruction to display each displayable terminal node of each displayed non-terminal node; and displaying each displayable terminal node of each displayed non-terminal node.

14. An apparatus to display a hierarchical data structure, the apparatus comprising:

a. a processor; and b. a memory, coupled to said processor, storing a plurality of instructions adapted to be executed by said processor to display a plurality of parent nodes within a first display area, each displayed parent node of the plurality of parent nodes having at least one child node;

determine that at most one child node for each displayed parent node of the plurality of parent nodes is to be displayed;

receive a child node scrolling instruction;

determine a child node display percentile based at least in part on the child node scrolling instruction;

select one child node of each displayed parent node of the plurality of parent nodes based at least in part on the determined child node display percentile; and display each selected one child node of each displayed parent node of the plurality of parent nodes in a second display area, each displayed child node being displayed as associated with the displayed parent node of the displayed child node.

15. A computer-readable medium storing a plurality of instructions adapted to be executed by a processor to display a hierarchical data structure, the plurality of instructions comprising instructions to:

display a plurality of parent nodes within a first display area, each displayed parent node of the plurality of parent nodes having at least one child node;

determine that at most one child node for each displayed parent node of the plurality of parent nodes is to be displayed;

receive a child node scrolling instruction;

determine a child node display percentile based at least in part on the child node scrolling instruction;

select one child node of each displayed parent node of the plurality of parent nodes based at least in part on the determined child node display percentile; and display each selected one child node of each displayed parent node of the plurality of parent nodes in a second display area, each displayed child node being displayed as associated with the displayed parent node of the displayed child node.

* * * * *